US012781667B2

(12) United States Patent
Vandenplas et al.

(10) Patent No.: US 12,781,667 B2
(45) Date of Patent: Nov. 3, 2026

(54) SYSTEM FOR COOLING OIL IN AN AIRCRAFT TURBINE ENGINE

(71) Applicants: SAFRAN AERO BOOSTERS, Herstal (BE); GENERAL ELECTRIC COMPANY, Schenectady, NY (US)

(72) Inventors: Xavier Vandenplas, Herstal (BE); Bruno Servais, Herstal (BE)

(73) Assignees: SAFRAN AERO BOOSTERS, Herstal (BE); GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/290,925

(22) PCT Filed: Jul. 22, 2021

(86) PCT No.: PCT/EP2021/070617

§ 371 (c)(1),
(2) Date: Jan. 22, 2024

(87) PCT Pub. No.: WO2023/001379

PCT Pub. Date: Jan. 26, 2023

(65) Prior Publication Data

US 2025/0035039 A1 Jan. 30, 2025

(51) Int. Cl.
*F02C 7/14* (2006.01)
*F01D 25/12* (2006.01)
(Continued)

(52) U.S. Cl.
CPC ................ *F02C 7/14* (2013.01); *F01D 25/12* (2013.01); *F02C 7/18* (2013.01); *F02K 3/077* (2013.01);
(Continued)

(58) Field of Classification Search
CPC ........ F02C 7/14; F02C 7/18; F05D 2260/213; F01D 25/12; F01D 25/18; F02K 3/077
See application file for complete search history.

(56) References Cited

U.S. PATENT DOCUMENTS 5,722,241 A * 3/1998 Huber .................... F02C 7/143 60/728
6,430,931 B1 * 8/2002 Horner .................... F02C 7/143 60/785
(Continued)

FOREIGN PATENT DOCUMENTS

BE 1025642 A1 5/2019
EP 2 075 194 A1 7/2009
(Continued)

OTHER PUBLICATIONS

International Search Report mailed Apr. 5, 2022, issued in corresponding International Application No. PCT/EP2021/070617, filed Jul. 22, 2021, 6 pages.
(Continued)

*Primary Examiner* — Alain Chau
(74) *Attorney, Agent, or Firm* — CHRISTENSEN O'CONNOR JOHNSON KINDNESS PLLC

(57) ABSTRACT

A system for cooling oil in an aircraft turbine engine includes an intermediate support casing configured to be located between a low-pressure compressor and a high-pressure compressor of the aircraft turbine engine. The system further includes a heat exchanger for cooling the oil by heat exchange with air. The heat exchanger is at least partially integrated into the intermediate support casing.

12 Claims, 4 Drawing Sheets

(51) Int. Cl.
*F02C 7/18* (2006.01)
*F02K 3/077* (2006.01)

(52) U.S. Cl.
CPC .... *F05D 2240/90* (2013.01); *F05D 2260/213* (2013.01)

(56) References Cited

U.S. PATENT DOCUMENTS

| | | | | |
|---|---|---|---|---|
| 9,051,943 | B2 * | 6/2015 | Elder | F04D 29/584 |
| 9,611,744 | B2 * | 4/2017 | Taylor | F01D 5/187 |
| 9,771,867 | B2 * | 9/2017 | Karam | F28D 7/0058 |
| 10,107,200 | B2 * | 10/2018 | Miller | F02C 9/18 |
| 10,208,676 | B2 * | 2/2019 | Johnson | F02K 3/075 |
| 10,364,750 | B2 * | 7/2019 | Rambo | F02K 3/115 |
| 10,539,076 | B2 * | 1/2020 | Niergarth | F16N 9/02 |
| 10,954,856 | B2 * | 3/2021 | Ramos | F02C 7/14 |
| 11,022,037 | B2 * | 6/2021 | Niergarth | F02C 7/143 |
| 11,143,104 | B2 * | 10/2021 | Pal | F02C 9/00 |
| 11,262,144 | B2 * | 3/2022 | Breeze-Stringfellow | F02K 3/06 |
| 11,346,247 | B2 * | 5/2022 | Zaccardi | F01D 25/12 |
| 11,725,584 | B2 * | 8/2023 | Niergarth | F02C 7/185 60/806 |
| 11,946,416 | B2 * | 4/2024 | Ellbrant | F01D 9/04 |
| 12,123,350 | B2 * | 10/2024 | Niergarth | F02K 3/06 |
| 2009/0165995 | A1 * | 7/2009 | Bajusz | F28F 3/12 60/39.83 |
| 2012/0114468 | A1 * | 5/2012 | Elder | F02C 7/14 415/178 |
| 2013/0239588 | A1 * | 9/2013 | Suciu | F01D 25/12 415/177 |
| 2016/0319748 | A1 | 11/2016 | Miller et al. | |
| 2017/0284303 | A1 * | 10/2017 | Johnson | F02K 3/075 |
| 2019/0003390 | A1 * | 1/2019 | Ramos | F02C 7/14 |
| 2019/0203644 | A1 * | 7/2019 | Niergarth | F01D 5/142 |
| 2019/0204010 | A1 * | 7/2019 | Breeze-Stringfellow | F28F 13/08 |
| 2019/0218971 | A1 * | 7/2019 | Niergarth | F02C 7/185 |
| 2019/0257247 | A1 * | 8/2019 | Pal | F02C 7/18 |
| 2020/0284160 | A1 * | 9/2020 | Zaccardi | F01D 9/042 |
| 2021/0262385 | A1 | 8/2021 | Kalevi Makela et al. | |
| 2022/0154644 | A1 * | 5/2022 | Johnson | F01D 25/12 |
| 2022/0282670 | A1 * | 9/2022 | Niergarth | F02C 7/18 |
| 2024/0328354 | A1 * | 10/2024 | Vandenplas | F02C 7/06 |

FOREIGN PATENT DOCUMENTS

| | | |
|---|---|---|
| EP | 3 361 055 A1 | 8/2018 |
| FR | 3 016 956 A1 | 7/2015 |
| FR | 3 046 199 A1 | 6/2017 |

OTHER PUBLICATIONS

Written Opinion mailed Apr. 5, 2022, issued in corresponding International Application No. PCT/EP2021/070617, filed Jul. 22, 2021, 5 pages.

U.S. Appl. No. 18/290,910, titled "System for Cooling Oil in an Aircraft Turbine Engine," filed Jan. 22, 2024 (not provided).

* cited by examiner

SYSTEM FOR COOLING OIL IN AN AIRCRAFT TURBINE ENGINE

FIELD OF THE DISCLOSURE

The present disclosure relates to a system for cooling oil in an aircraft turbine engine.

BACKGROUND

The increased performance of aircraft turbine engines is leading to an increase in thermal rejection towards the oil. A heat exchanger for cooling the oil is known, in particular, from the document BE2017/5735.

SUMMARY

The object of the disclosure is to improve the integration of a heat exchanger for cooling oil in an aircraft turbine engine.

To this end, the disclosure proposes a system for cooling oil in an aircraft turbine engine, and comprising an intermediate support casing intended to be located between a low-pressure compressor and a high-pressure compressor of the aircraft turbine engine, and a heat exchanger intended to cool the oil by heat exchange with air; the heat exchanger being at least partially integrated into the intermediate support casing.

The integration, at least partially, of the heat exchanger in the intermediate support casing results in a more compact and lighter turbine engine. It also reduces the production cost of the turbine engine.

The turbine engine can be dual-flow, in which case it comprises a primary duct and a secondary duct. The turbine engine can be triple flow, in which case it comprises a primary duct, a secondary duct and a tertiary duct.

According to advantageous embodiments of the disclosure, it may comprise one or more of the following characteristics, taken alone or in any possible technical combination:

- the heat exchanger comprises a primary duct surface configured to be in a primary duct of the aircraft turbine engine;
- the primary duct surface is configured to be between the most downstream vane of the low-pressure compressor and the most upstream vane of the high-pressure compressor;
- the heat exchanger is configured to partially obstruct the primary duct;
- the heat exchanger comprises a secondary duct surface configured to be in a secondary duct of the aircraft turbine engine;
- the heat exchanger is configured to extend radially between the primary duct and a secondary duct, and comprises a secondary duct surface configured to be in a secondary duct of the aircraft turbine engine;
- the heat exchanger is configured to partially obstruct the secondary duct;
- the heat exchanger comprises a tertiary duct surface configured to be in a tertiary duct of the aircraft turbine engine;
- the heat exchanger is configured to partially obstruct the tertiary duct;
- the heat exchanger is annular and is configured to extend around an axis of the aircraft turbine engine;

- the heat exchanger comprises fins configured to extend radially and parallel to the axis of the aircraft turbine engine;
- the heat exchanger is a part attached to the intermediate support casing, or the heat exchanger and the intermediate support casing are made of the same part.

The disclosure also proposes an aircraft turbine engine comprising such a system, a low-pressure compressor and a high-pressure compressor, the intermediate support casing being located between the low-pressure compressor and the high-pressure compressor.

The disclosure also proposes an aircraft comprising such a turbine engine.

DESCRIPTION OF THE DRAWINGS

Further characteristics and advantages of the disclosure will become apparent from the following detailed description, for the understanding of which reference is made to the appended figures, among which.

DETAILED DESCRIPTION

This portion of the text describes in detail preferred embodiments of the disclosure. References to figures are used but the disclosure is not limited by them. The drawings and/or figures described below are schematic only and are not limiting.

In the context of this document, reference is made to the "axial", "circumferential" and "radial" directions corresponding respectively to directions parallel to the drive axis, essentially circular around the drive axis, and perpendicular to the drive axis. Markings on the figures illustrate these directions (with a meaning), noted X, R and C respectively. The terms "inwardly" and "inwards" naturally correspond to an orientation towards the drive axis X in a radial direction, and the terms "outwardly" and "outwards" to the opposite orientation in this direction.

Figure 1:
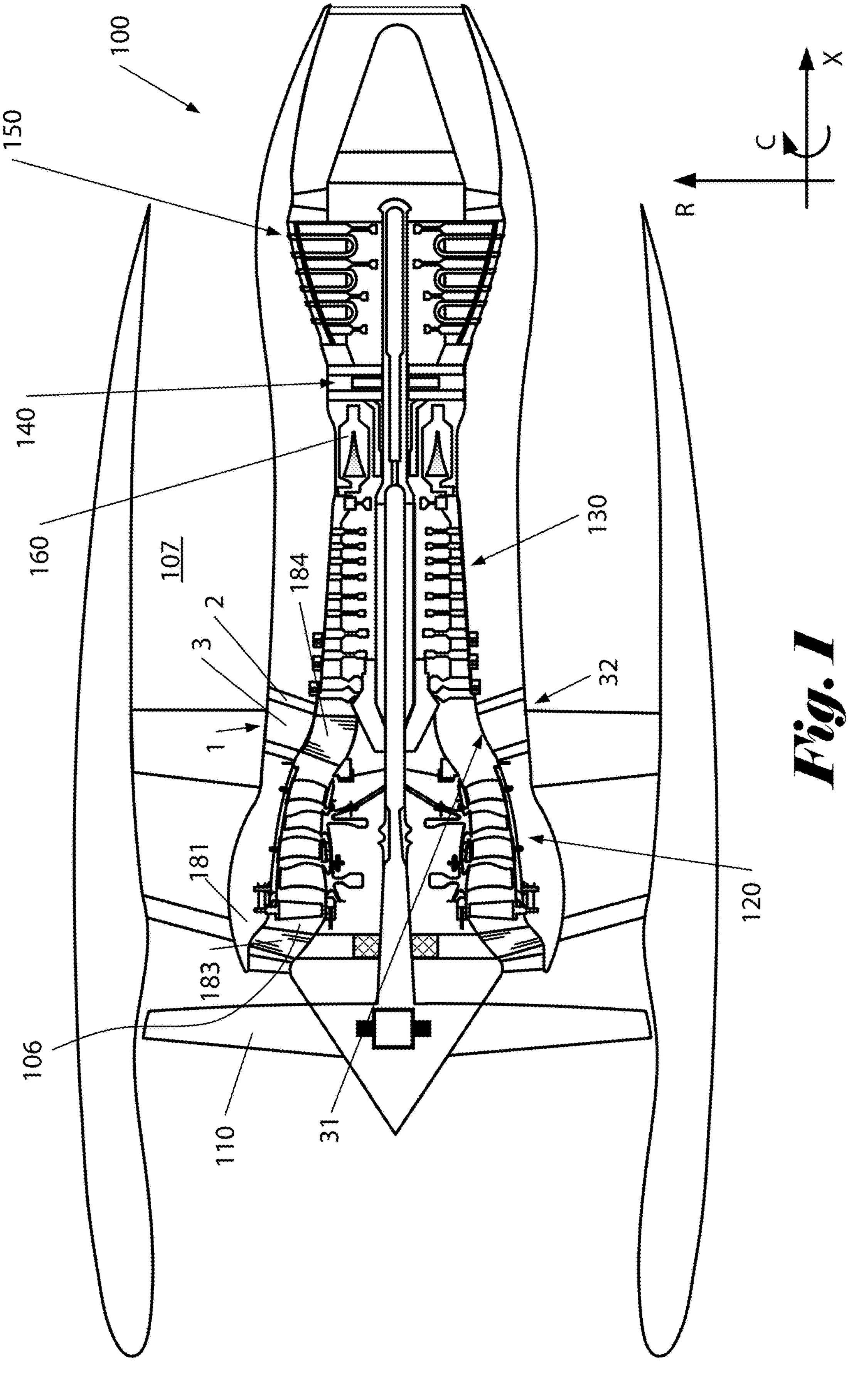
FIG. 1 is a cross-sectional view, along the axis, of an aircraft turbine engine comprising an example of a system according to the disclosure.
Figure 3:
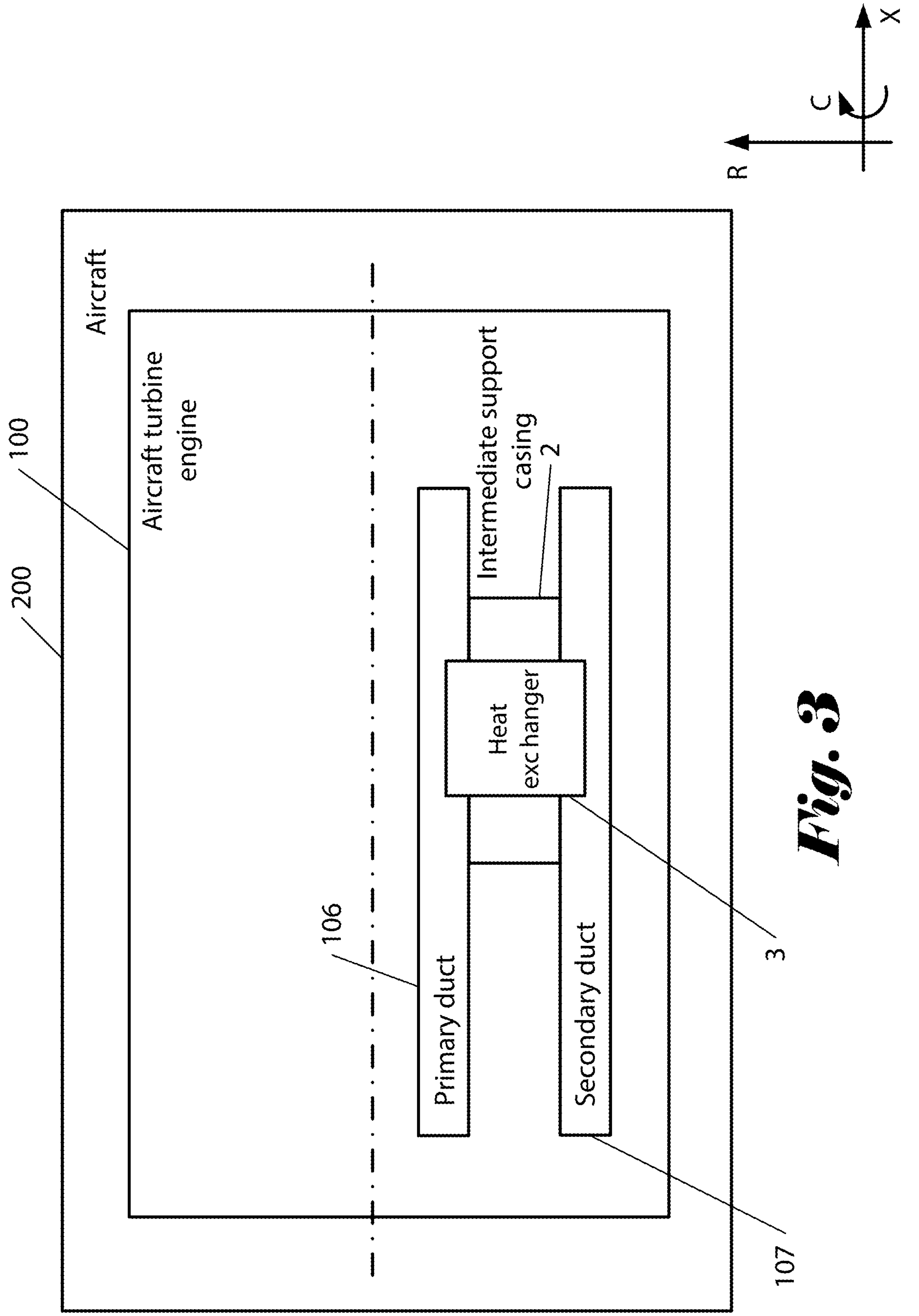
FIG. 3 is a schematic view of an aircraft having the aircraft turbine engine of FIG. 1.

FIGS. 1 and 3 illustrate an example of an aircraft 200 with an aircraft turbine engine 100 comprising a system 1 for cooling oil according to one embodiment of the disclosure. The aircraft turbine engine 100 is an axial dual flow turbine engine comprising, in succession along the drive axis X, a fan 110, a low-pressure compressor 120, a high-pressure compressor 130, a combustion chamber 160, a high-pressure turbine 140 and a low-pressure turbine 150. The fan 110 generates a primary air stream in a primary duct 106 and a secondary air stream in a secondary duct 107.

The aircraft turbine engine 100 comprises an inlet support casing 181 located downstream of the fan 110. The inlet support casing 181 is provided with an annular handle delimiting the primary duct 106 and structural arms 183 which extend radially inwards through the primary duct 106.

The aircraft turbine engine 100 comprises an intermediate support casing 2 between the low-pressure 120 and high-pressure 130 compressors. The intermediate support casing 2 comprises an annular handle, preferably with a swan-neck profile, delimiting the primary duct 106 between the low-pressure 120 and high-pressure 130 compressors. It also has structural arms 184 extending radially across the primary duct 106.

Figure 2:
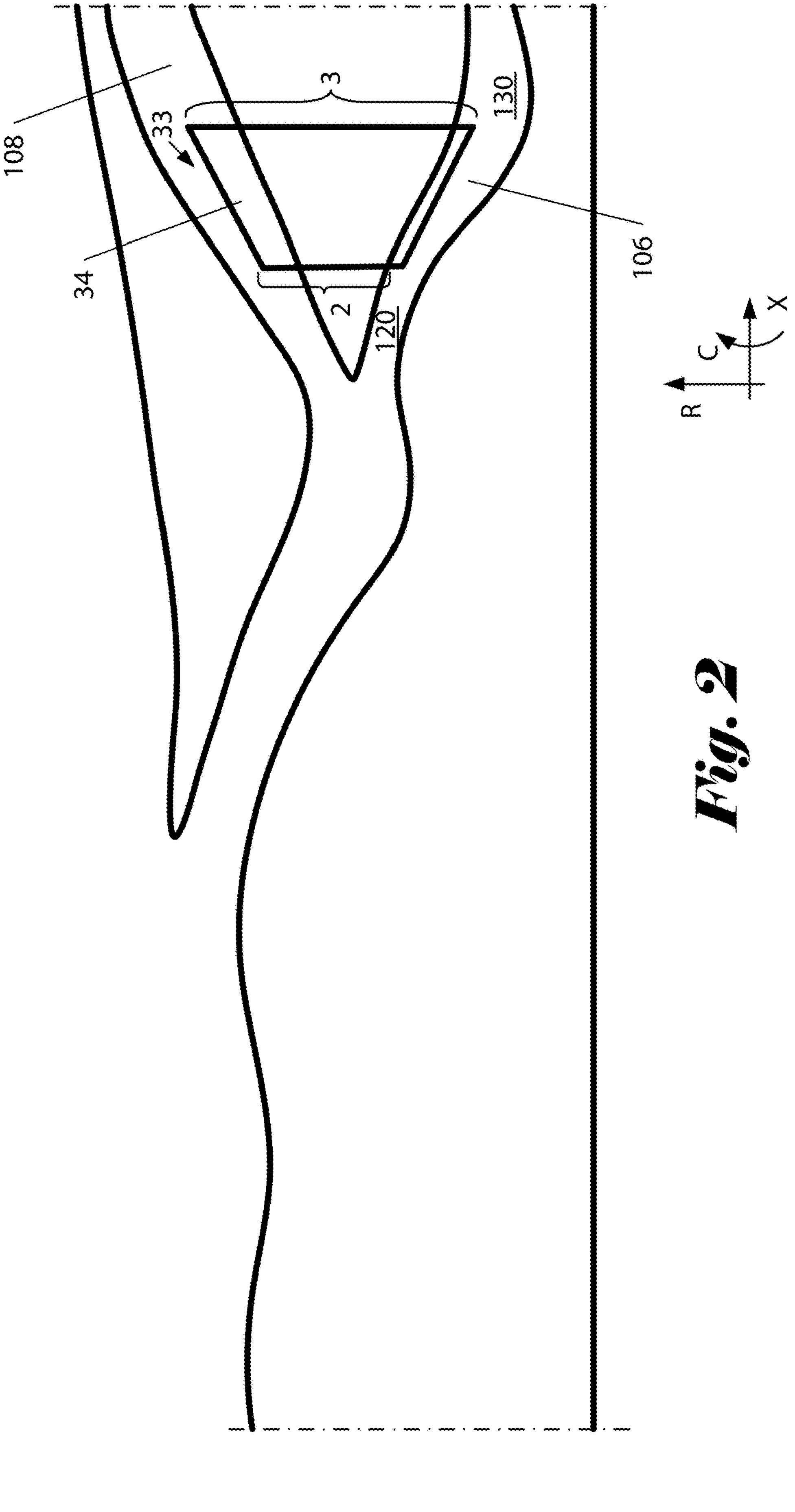
FIG. 2 is a cross-sectional view, along the axis, of another aircraft turbine engine comprising another example of a system according to the disclosure.

FIG. 2 schematically illustrates the respective positions of the low-pressure 120 and high-pressure 130 compressors, the intermediate support casing 2, the primary duct 106 and a tertiary duct 108 in the case of a triple-flow turbine engine.

The system 1 according to the disclosure comprises an intermediate support casing 2, for example as illustrated in FIG. 1 or FIG. 2, and a heat exchanger 3 at least partially integrated in the intermediate support casing 2. The heat exchanger 3 has at least one surface in the primary duct 106 and/or in the secondary duct 107 (FIG. 1) and/or in the tertiary duct 108 (FIG. 2). The heat exchanger 3 comprises a fluid inlet allowing oil to flow in and a fluid outlet allowing oil to flow out.

The heat exchanger 3 can be annular around the axis X of the turbine engine.

The heat exchanger 3 can be a part attached to the intermediate support casing 2 or be integral with the intermediate support casing 2.

The heat exchanger 3 may be axially at the same level as the structural arms 184.

In the example shown in FIG. 1, the heat exchanger 3 passes radially through the intermediate support casing 2 and has a primary duct surface 31, radially internal, in the primary duct 106, and a secondary duct surface 32, radially external, in the secondary duct 107.

The primary duct surface 31 is downstream of the most downstream vane of the low-pressure compressor 120, and upstream of the most upstream vane of the high-pressure compressor 130.

In the example shown in FIG. 2, the heat exchanger 3 partially obstructs the primary duct 106 and the tertiary duct 108.

Figure 4:
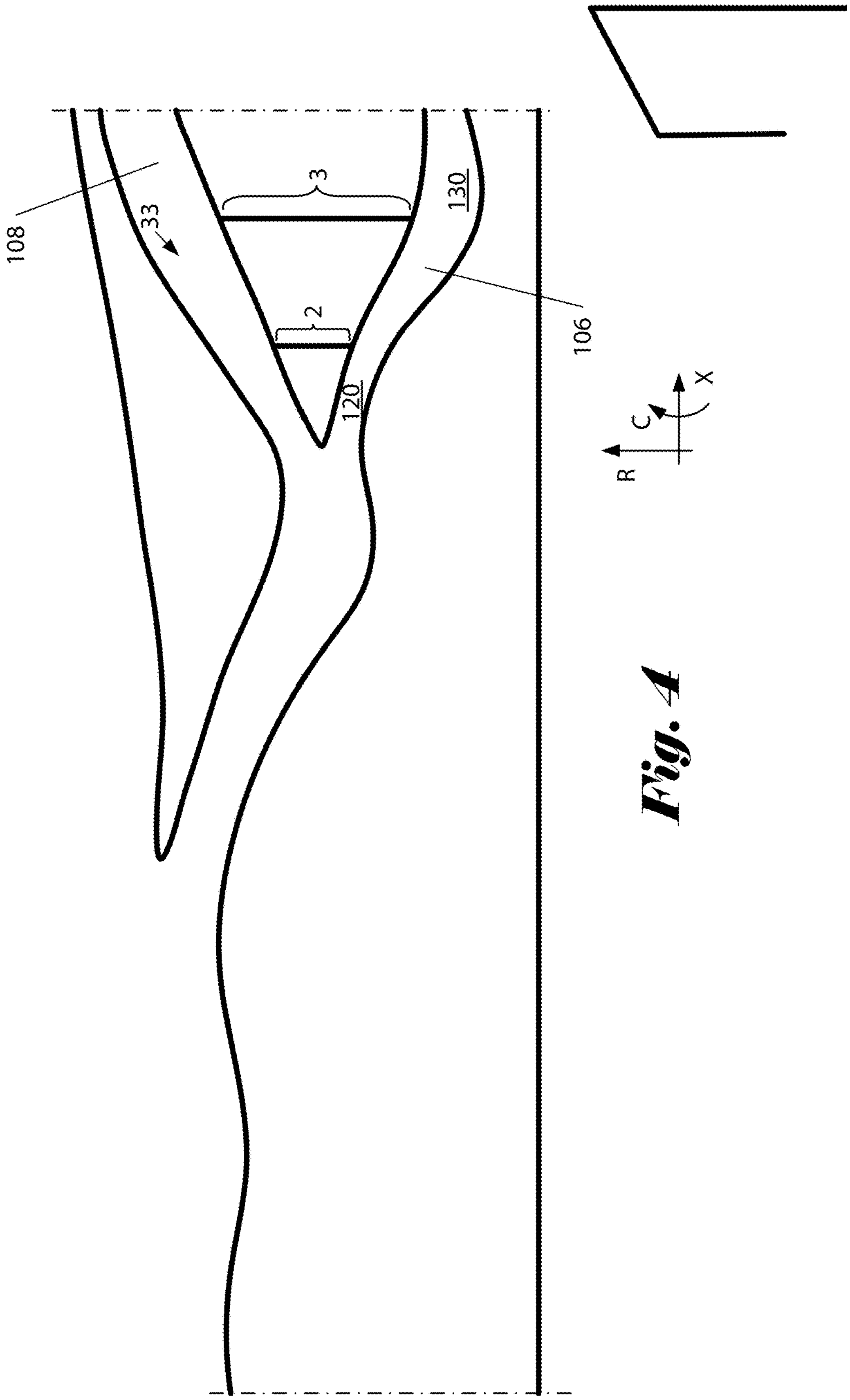
FIG. 4 is a cross-sectional view, along the axis, of another aircraft turbine engine comprising another example of a system according to the disclosure.

In the example shown in FIG. 4, the heat exchanger 3 partially delimits the primary duct and the tertiary duct 108.

The present disclosure has been described above in connection with specific embodiments, which are illustrative and should not be considered limiting. In a general manner, the present disclosure is not limited to the examples illustrated and/or described above. The use of the verbs "consist", "include", "comprise", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

The invention claimed is:

1. A triple-flow aircraft turbine engine, comprising:

a primary duct in which a low-pressure compressor and a high-pressure compressor of the aircraft turbine engine are arranged;

a secondary duct;

a tertiary duct; and a system for cooling oil in an aircraft turbine engine, the system comprising:

an intermediate support casing configured to be located between the low-pressure compressor and the high-pressure compressor of the aircraft turbine engine; and a heat exchanger configured to cool the oil by heat exchange with air, the heat exchanger being at least partially integrated into the intermediate support casing, wherein the heat exchanger is configured to partially obstruct or delimit the primary duct of the aircraft turbine engine, wherein the heat exchanger is configured to be between a most downstream vane of the low-pressure compressor, and a most upstream vane of the high-pressure compressor, and wherein the heat exchanger comprises a secondary duct surface configured to be in the secondary duct of the aircraft turbine engine.

2. The triple-flow aircraft turbine engine according to claim 1, wherein the heat exchanger is configured to partially obstruct the primary duct.

3. The triple-flow aircraft turbine engine according to claim 1, wherein the heat exchanger is configured to extend radially between the primary duct and the secondary duct, and comprises a secondary duct surface configured to be in the secondary duct of the aircraft turbine engine.

4. The triple-flow aircraft turbine engine according to claim 1, wherein the heat exchanger is configured to partially obstruct the secondary duct.

5. The triple-flow aircraft turbine engine according to claim 1, wherein the heat exchanger is annular and is configured to extend around an axis of the aircraft turbine engine.

6. The triple-flow aircraft turbine engine according to claim 1, wherein the heat exchanger comprises fins configured to extend radially and parallel to an axis of the aircraft turbine engine.

7. The triple-flow aircraft turbine engine according to claim 1, wherein the heat exchanger is a part fixed to the intermediate support casing.

8. The triple-flow aircraft turbine engine according to claim 1, wherein the heat exchanger is integral with the intermediate support casing.

9. An aircraft comprising the triple-flow aircraft turbine engine according to claim 1.

10. A triple-flow aircraft turbine engine, comprising:

a primary duct in which a low-pressure compressor and a high-pressure compressor of the aircraft turbine engine are arranged;

a secondary duct;

a tertiary duct; and a system for cooling oil in an aircraft turbine engine, the system comprising:

an intermediate support casing configured to be located between the low-pressure compressor and the high-pressure compressor of the aircraft turbine engine; and a heat exchanger configured to cool the oil by heat exchange with air, the heat exchanger being at least partially integrated into the intermediate support casing, wherein the heat exchanger is configured to partially obstruct or delimit the primary duct of the aircraft turbine engine, wherein the heat exchanger is configured to be between a most downstream vane of the low-pressure compressor, and a most upstream vane of the high-pressure compressor, and wherein the heat exchanger comprises a tertiary duct surface configured to be in the tertiary duct of the aircraft turbine engine.

11. The triple-flow aircraft turbine engine according to claim 1, wherein the heat exchanger comprises a tertiary duct surface configured to be in the tertiary duct of the aircraft turbine engine.

12. The triple-flow aircraft turbine engine according to claim 10, wherein the heat exchanger is configured to partially obstruct the tertiary duct.

* * * * *